J. EVERED.
Horse Hay-Rakes.
No. 157,808.  Patented Dec. 15, 1874.
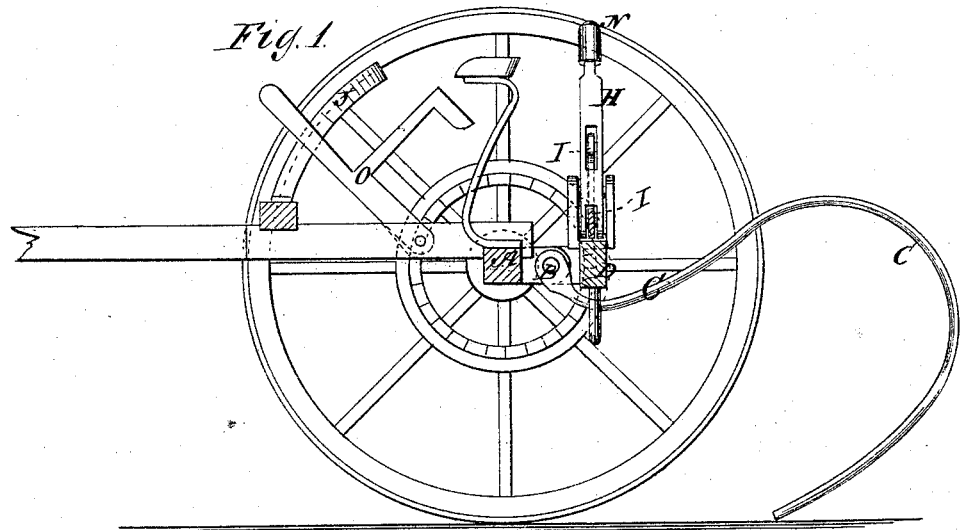
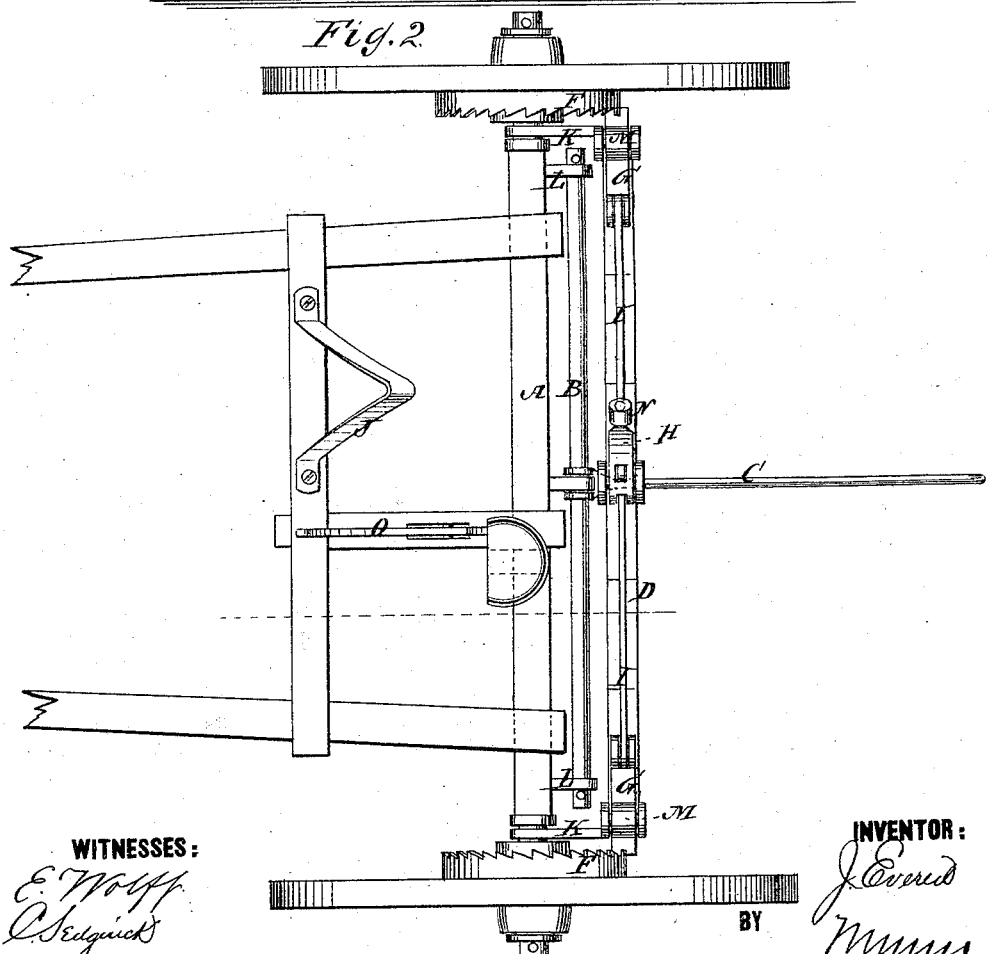
WITNESSES:  
E. Wolff  
C. Sedgwick
INVENTOR:  
J. Evered  
BY  
ATTORNEYS.

UNITED STATES PATENT OFFICE.

JOSHUA EVERED, OF HOPEWELL, NEW YORK.

IMPROVEMENT IN HORSE HAY-RAKES.

Specification forming part of Letters Patent No. 157,808, dated December 15, 1874; application filed June 6, 1874.

*To all whom it may concern:*

Be it known that I, JOSHUA EVERED, of Hopewell, in the county of Ontario and State of New York, have invented a new and Improved Horse Hay-Rake, of which the following is a specification:

Referring to the drawing, Figure 1 is a cross-section of the machine in the plane indicated by dotted line, Fig. 2, which latter is a plan view of the same.

The invention is an improvement in the class of wheeled horse hay-rakes whose pivoted wire teeth are elevated by a lifting-bar.

The invention relates to the arrangement of the teeth on a fixed fulcrum-rod, and a lifting-bar pivoted to the axle, the locking-pawls, and ratchets fixed on the wheel-hubs, as hereinafter described.

The axle A and the thills or shafts of the truck are rigidly connected. The wheel-hubs have ratchets or toothed rims F secured on their inner ends. The teeth C are pivoted to a rod, B, which is arranged in rear of and parallel to the axle A, and supported in rigid arms L; or the axle may be constructed with two bends or angles, and the ends of the rod B enter the journal-boxes. The lifting-bar D is pivoted to the axle by links K, and provided with staples inserted in its under side, through which the teeth C pass. The pawls G G, by which connection is made between the bar D and ratchets F, slide on said bar in sockets having friction-rollers M, and are operated by rods I and a pivoted lever, H, having a weighted handle, N, which projects up into convenient proximity to the driver's seat. One of the rods, I, is pivoted to the lever H above and the other below its fulcrum, so that the weight of the lever holds the pawls G either engaged with or disengaged from ratchets G, according as it is inclined toward one side or the other.

As shown in the drawing, the driver is supposed to have thrown the lever toward the right wheel, and the pawls been thereby locked with the ratchet, so that, as the wheels revolve forward, the bar D will be raised, and with it the teeth C, thus releasing the roll or bundle of gathered hay. In this operation the teeth slide through the staples, and turn on the fixed rod B, while the bar D makes a quarter revolution (more or less) around the axle as a center, until the driver disengages the pawls and ratchets by reversing the lever, when the teeth and lifting bar resume their former position.

It will be observed that, when these parts are being elevated, as above described, the pressure due to their weight is borne by the pawls G. The function of rollers M is, therefore, to relieve the friction, which would otherwise render the reversal of lever H somewhat difficult. The rollers are suitably journaled in metal plates attached to bar D.

What I claim is—

The combination, with the axle A and fixed fulcrum-bar B, arranged in rear of and parallel thereto, of the teeth C, the bar D provided with staples on its under side to receive said teeth, the links K pivoted to the axle, the ratchets F on the wheel-hubs, and locking-pawls G, all as shown and described.

JOSHUA EVERED.

Witnesses:
ROBERT MITCHELL,
JOHN A. MITCHELL.